June 11, 1957 C. OTTO 2,795,487
APPARATUS FOR PRODUCING AMMONIUM SULPHATE CRYSTALS
Filed Feb. 2, 1954 2 Sheets-Sheet 1

INVENTOR.
CARL OTTO
BY John E. Hubbell
ATTORNEY

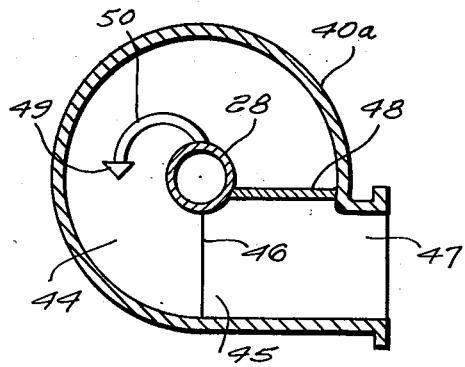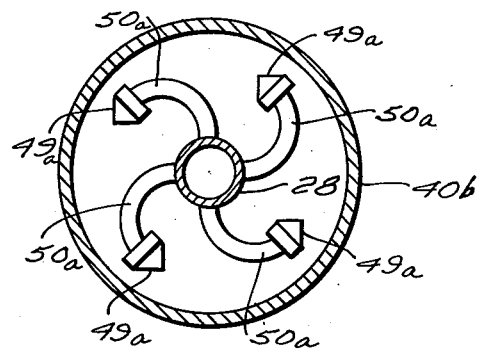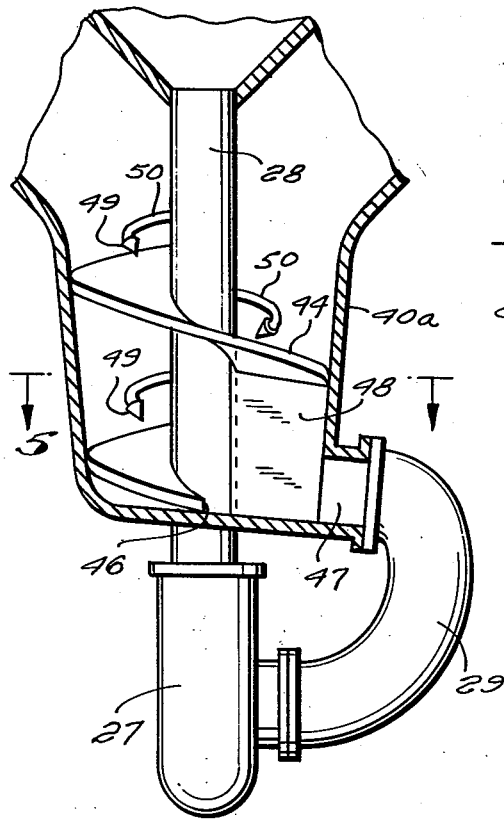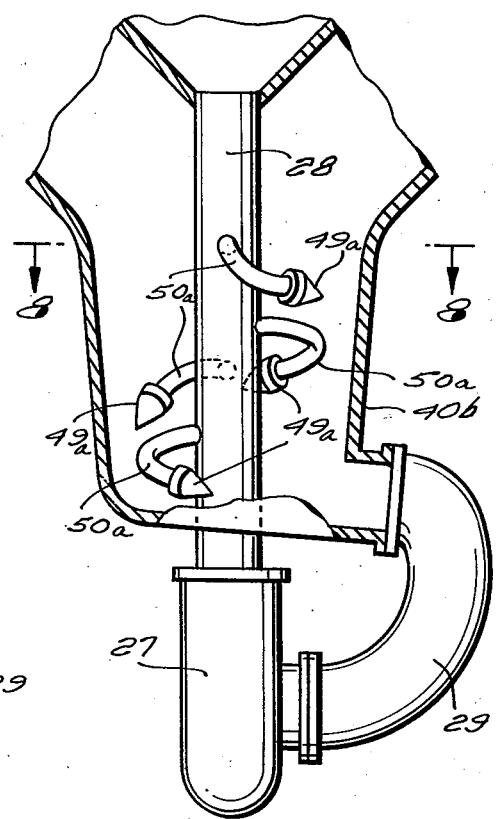

United States Patent Office 2,795,487
Patented June 11, 1957

2,795,487

APPARATUS FOR PRODUCING AMMONIUM SULFATE CRYSTALS

Carl Otto, Manhasset, N. Y.

Application February 2, 1954, Serial No. 407,666

7 Claims. (Cl. 23—273)

The present invention is a specific modification of the generic invention for producing ammonium sulphate which is disclosed and claimed in my prior Patent No. 2,599,067, granted June 3, 1952. That patent discloses a method of and apparatus for the production of ammonium sulphate by spraying acidulated ammonium sulphate liquor and entrained crystals into a scrubbing space through which a stream of coke oven gas having a small ammonia content is passing. The invention of said patent is now in extensive use in this country.

In my application for patent, Serial No. 390,439, filed November 6, 1953, I have illustrated and described an ammonia saturator which is an embodiment of the generic invention of the above mentioned patent, and in which the scrubbing chamber comprises the annular space between the inner and outer walls of concentric vertical tank portions of dissimilar diameters, and in which liquor and crystals passing downward through said annular space are collected in a bath space having its walls consisting in part at least of conical or cup shaped lower end portions of the inner and outer tank. In the last mentioned application, liquor and crystals are pumped from the bath space into a central classifying and crystallizing space surrounded by the inner tank wall, and from which relatively large crystals and entraining liquor are withdrawn from the lower end of said central space, and the remainder of said liquor and crystals are sprayed under pressure into the previously mentioned scrubbing space.

The general object of the present invention is to provide an ammonia saturator which embodies the generic invention of the above mentioned patent, and has the above described saturator structural and operating characteristics disclosed in the above mentioned application, Serial No. 390,439, and includes improved means for pumping liquor and crystals from the bath space into the central space of the apparatus described in said application. More specifically, the major object of the present invention is to provide means for passing liquor and crystals from the collecting space into said inner space in such manner as to eliminate or minimize risk of deposits of ammonium sulphate crystals in the lower portion of said bath space and in the pump and conduit means through which liquor and crystals are passed into said central space.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 5 is a section on the line 5—5 of Fig. 6;

Figs. 6 and 7 are sectional elevations each illustrating a different modification of the apparatus shown in Figs. 1 to 4; and Fig. 8 is a section on the line 8—8 of Fig. 7.

Figure 1:
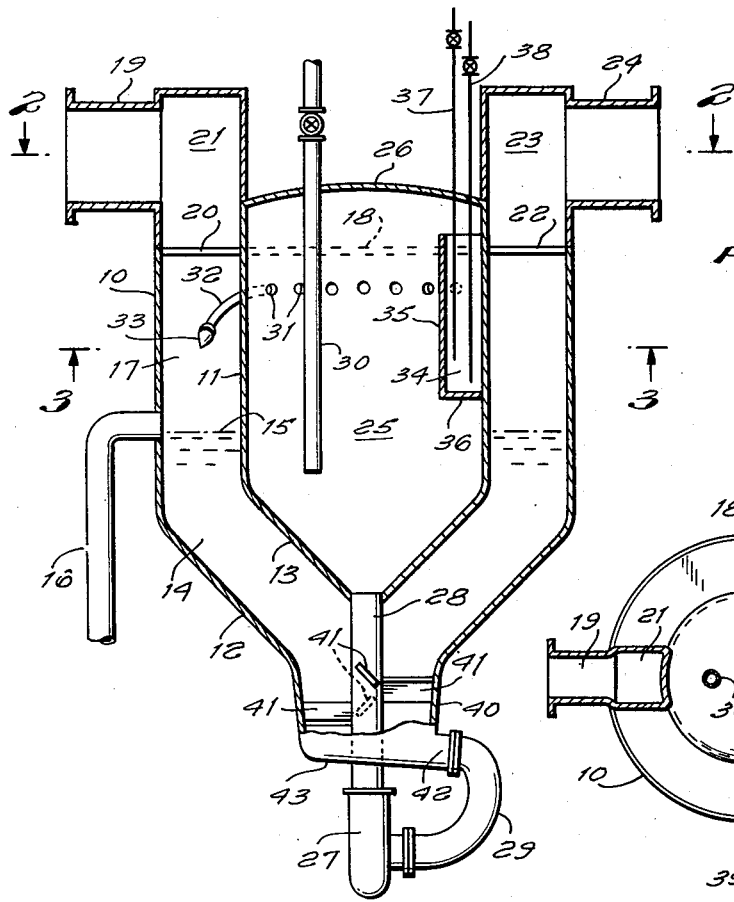
Fig. 1 is a flow diagram illustrating the present invention.
Figure 2:
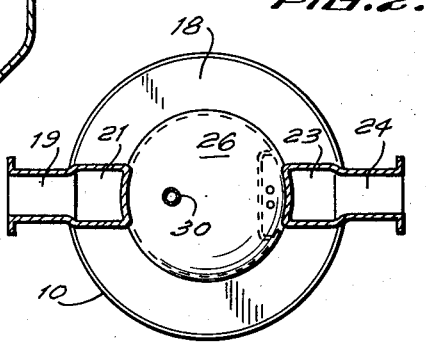
Fig. 2 is a reduced scale section on the line 2—2 of Fig. 1.

The embodiment of the present invention illustrated by way of example in the accompanying drawings, comprises an outer tank 10 having a vertical cylindrical wall which surrounds and is spaced away from the coaxial vertical cylindrical wall of an inner tank 11. The tank 10 has a conical or dished bottom wall 12 below and spaced away from the bottom wall 13 of the tank 11. As shown, the bottom walls 12 and 13 are similarly shaped. A bath space 14 which is shown as including the space between the bottom walls 12 and 13, and the lower portions of the space between the vertical walls of the tanks 10 and 11, is normally filled with liquor and crystals up to a level 15 fixed by an overflow pipe 16. The annular tank space 17 between the vertical walls of the tanks 10 and 11 and between the overflow level 15 and the top wall 18 of the tank space 17, constitutes a scrubbing space normally filled with gas. In normal operation, a stream of gas is continuously passed into the scrubbing space 17 from a gas supply pipe 19 through an opening or port 20 in the top wall 18, and a conduit section 21 connected between the opening 20 and the discharge end of the gas pipe 19. Gas passes away from the scrubbing space 17 through a port 22 in the top wall 18, and a conduit connection 23 to a gas discharge pipe 24. As shown, the inlet and outlet ports 20 and 22, respectively, of the scrubbing space or chamber 17 are located at opposite sides of the common axis of the tanks 10 and 11.

The outer wall of the tank 11 surrounds a central space 25 which extends upward from the bottom wall 13 of that tank and has its upper end closed by a top wall 26. The latter is shown as dished with its convex side uppermost and is some distance above the top wall 18 of the scrubbing space 17.

Figure 3:
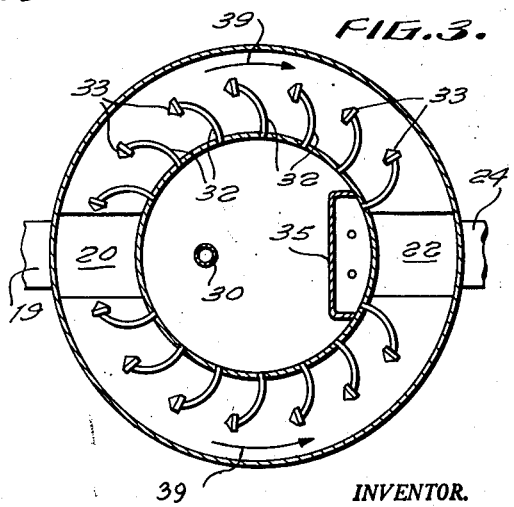
Fig. 3 is a reduced scale section on the line 3—3 of Fig. 1.

In the normal operation of the apparatus shown in Fig. 3, ammonium sulphate liquor and entrained crystals are continuously injected under pressure into the lower end of the tank space 25 through the discharge pipe 28 of a pump 27. The pump 27 has its inlet pipe 29 opening into the bath space 14.

The pump 27 thus operates to maintain a liquor pressure in the tank 11 which is higher than the liquor pressure in the bath space 14. The liquor collecting in the bath space 14 may be wholly desupersaturated in that space, but ordinarily will be desupersaturated partly in the bath space 14 and partly in the tank space 25. In any event, the tank space 25 acts as a classifier space so that the average size of the crystals in the lower portion of the tank 11 will be larger than the average size of the crystals in the upper portion of that tank. A conduit 30 shown as extending through the top wall 18 of the tank 11 has its open lower end in or adjacent the hopper bottom portion of the tank 11. The conduit 30 is employed to convey crystals and entraining liquor to crystal separating and drying apparatus, which may be of conventional type, and does not need to be illustrated or further described herein.

Liquor and entrained crystals are also continuously being expelled from the upper portion of the tank 11 through outlet ports 31, each port being in communication with an individual spray pipe 32 terminating in a spray nozzle 33. Advantageously and as shown, the spray pipes 32 are curved so that each spray nozzle discharges a spray in a direction opposite to the generally horizontal direction of flow of the gas stream in the space 17 which flows from the space beneath the inlet opening 20 to the space beneath the outlet opening 22. The spray nozzles 33 are advantageously of known, non-blocking, atomizing type. The number of spray nozzles 33 employed may vary with the conditions of use. As shown, there are seven spray pipes 33 in each of the arc-shaped flow paths at opposite sides of the portions of the space 17 directly below the top wall openings 14 and 18.

Although not essential to the use of the present invention, two nozzles 33 adjacent the outlet opening 22 are shown as having their inlet ends opening into a segregation chamber 34 in the tank 11, in accordance with the invention disclosed and claimed in my above mentioned application, Serial No. 390,439. The wall of the chamber 34 comprises a vertical portion 35 having its vertical edges welded or otherwise attached to the cylindrical wall of the tank 11, and has a horizontal wall portion 36 extending between the wall portion 35 and the adjacent portion of the wall of the tank 11, and closing the lower end of the chamber 34. The open upper end of the chamber 34 is appreciably below the top wall 18 of the tank 11. Steam under pressure is injected into the chamber 34 through a valved steam supply pipe 37. Advantageously also, the make-up acid combining with the ammonia in the gas is supplied under suitable pressure through a valved pipe 38 which discharges into the chamber 34.

As is explained in my prior application, Serial No. 390,439, the steam injected into the chamber 34 and directly heating the liquor in that chamber reduces the small sized crystal content of that liquor. The liquor heated in the chamber 34 and sprayed into the scrubbing space 17 adjacent the gas outlet port 22, produces an evaporative effect which increases the rate at which ammonium sulphate is deposited in crystalline form on the crystals moving downward through the saturator space. The crystal growth thus effected makes it practically possible to produce crystals of average size which are as large as appears to be practically desirable and which are substantially larger than the ammonium sulphate crystals practically obtainable in spray saturators in which no such evaporative effect is produced. In practice, the temperature increase in the upper portion of the scrubbing space 17, required to substantially increase the size of the crystals, may be about 2° C.

The general direction of the flow of gas between the gas inlet opening 20 and the outlet opening 22 of the scrubbing space is indicated by the arrows 39 in Fig. 3, and is opposed to the general direction of each jet discharged by the corresponding nozzle 33. As is indicated in the drawings, the nozzles 33 have their discharge axes inclined downwardly from the horizontal.

For optimum operating results, it is practically essential that the pressure of the spray liquor passed to the spray nozzles 33, should be of the order of 10 to 15 or more pounds per square inch above the gas pressure in the scrubbing space. In consequence, the pressure at which liquor is passed into the tank 11 by the pump 27 should be 10 to 15 or more pounds per square inch, plus the difference between the liquor pressure in the bottom portion of the tank 11 and the pressure of the gas in the scrubbing space 17.

The general type of apparatus shown alike in Fig. 1 and in my said copending application, Serial No. 390,439 as heretofore constructed and operated, is open to the objection that crystals tend to accumulate in the lower portion of the bath space 14 in the form of a mass of solidified ammonium sulphate which is of the character commonly referred to as "rock salt." When such rock salt begins to accumulate in the bath space 14 adjacent the connection 29 to the inlet of the pump 27, the rock salt mass tends to build up with increasing rapidity, and the accumulation of solidified ammonium sulphate must be removed from time to time to avoid serious interference with normal operation. The removal of such a solidified mass of ammonium sulphate is ordinarily effected by injecting hot water in the bath space and thereby dissolving and flushing out the previously solidified rock salt. Each such removal operation is time consuming and interferes with the normal operation of the saturator.

Figs. 4 to 8 illustrate, by way of example, various arrangements for eliminating or reducing solidified ammonium sulphate deposits in the bath space of a saturator which is of the general type shown in the instant application, and in my said prior application, Serial No. 390,439. The various forms of the invention illustrated in Figs. 4 to 8 are generically alike in that they include provisions for giving a whirling or spiral movement to the liquor and crystals adjacent the outlet and moving from the bath space 14 to the outlet through which liquor and crystals are passed to the inlet of the pump 27.

Figure 4:
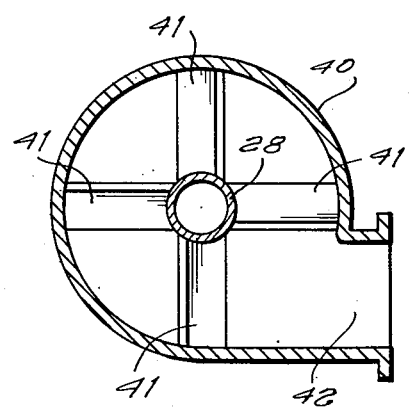
Fig. 4 is an inverted plan view of the lower portion of the apparatus shown in Fig. 1.

The lower portion of the bath space 14 shown in Figs. 1 to 4 is a tubular discharge section 40 through the central portion of which the pump outlet pipe 28 passes. That section may be a cylinder, but as shown, is tapered with its diameter slightly greater at its upper end than at its lower end. As shown in Figs. 1 and 4, baffles 41 extend radially away from the pipe 28 into engagement with the surrounding wall of the section 40. The baffles 41 are arranged in a spiral, each lower baffle extending radially away from the pipe 28 at an angle of 90° relative to the nearest baffle above it. As shown, there are four baffles 41 at four different levels. As shown, the baffles 41 are shaped and arranged to cause the liquor and crystals passing downward over the baffles to move spirally about the pipe 28. With the baffle arrangement shown in Figs. 1 and 4, liquor and entrained crystals flow in the counter-clockwise direction, as seen in Fig. 4, about the pipe 28, and each baffle 41 is a straight bar extending radially away from the pipe 28. The upper and lower surfaces of each baffle 41 are shown as inclined to the horizontal, but the baffles 41 may be curved or otherwise shaped to facilitate the desired liquor and crystal whirling movement about the pipe 28. When the chamber 40 is tapered as shown, the whirling velocity of the liquor and crystals tends to increase as the distance below the upper end of the space 40 increases. As shown in Figs. 1 and 4, the member 40 is formed with a tangential outlet 42 directly above the lower end wall 43 of the tank section 40. The outlet 42 opens into the upper end of the curved pipe 29 through which liquor and crystals pass from the outlet to the inlet of the pump 27.

In the modification shown in Figs. 5 and 6, the member 40 of Fig. 1 is replaced by a section 40a which surrounds and is coaxial with the pipe 28. In Figs. 5 and 6, the plurality of baffles 41 shown in Figs. 1 and 4 are replaced by a single baffle in the form of a spiral helix 44 curved about the pipe 28. The lower end of the helix 44 extends into engagement with the bottom wall 45 of the element 40a along the line 46. The line 46 may, and as shown, does extend away from the pipe 28 to the surrounding wall of the section 40a. That section has a tangential outlet 47 connected to the inlet of the associated pump 27 by a pipe section 29 as in the arrangement shown by Figs. 1 and 4. A vertical wall 48 extends between the pipe 28 and the peripheral portion of the cylinder 40a at the right of the pipe 28, as seen in Figs. 5 and 6, so that the liquor and crystals moving down over the lower portion of the baffle 44 are directly guided toward the outlet 47.

As shown in Figs. 5 and 6, the whirling action of the liquor and crystals passing to the outlet 47 is augmented by the recirculation of a portion of the liquor passed into the pipe 28 by the pump 27. The liquor and crystals thus recirculated are returned to the interior of the section 40a by spray nozzles 49 located at different levels and each connected by a curved pipe 50 to the space within the pipe 28. The pipes 50 are advantageously bent and inclined so that each nozzle 49 discharges liquor and crystals in a direction generally parallel to the liquor and crystal flow above the immediately subjacent section of the helix 44.

The arrangement shown in Figs. 7 and 8 differs essentially from the arrangement shown in Figs. 5 and 6 only by the omission of the helix 44. In some cases, the spray nozzles 49a and pipe 50a of the arrangement shown in Fig. 7, may well be larger in cross section than the nozzles 49 and pipes 50 in tank units of the same capacity.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A spray saturator for converting the ammonia content of coke oven gas into ammonium sulphate liquor and crystals, comprising first and second peripherally continuous wall structures disposed one within the other to define separate inner and outer chambers, one of said chambers being adapted to be partially filled with an ammonia liquor bath and to have a scrubbing space thereabove, the other of said chambers being normally filled with ammonium sulphate liquor and crystals under pressure greater than the pressure in said scrubbing space, a first conduit means for introducing ammonia gas into said scrubbing space, a second conduit means for withdrawing gas from said scrubbing space, spray means extending through the inner peripheral wall for receiving liquor and crystals from said other chamber and for spraying said liquor and crystals into said scrubbing space for removing ammonia from the gas within said scrubbing space, means for withdrawing liquor from a lower portion of said bath space and for passing said liquor into said other chamber, and means fixedly positioned in the lower portion of said outer chamber for deflecting the flow of liquor in said bath toward said lower portion thereof for withdrawal therefrom, whereby to diminish the tendency of crystals to accumulate in said lower portion.

2. A spray saturator for converting the ammonia content of coke oven gas into ammonium sulphate liquor and crystals, comprising first and second vertically extending peripherally continuous wall structures disposed one within the other to define separate inner and outer chambers having spaced tapered bottoms, the outer of said chambers being adapted to be partially filled with an ammonia liquor bath and to have a scrubbing space thereabove, the inner of said chambers being normally filled with ammonium sulphate liquor and crystals under pressure greater than the pressure in said scrubbing space, a first conduit means for introducing ammonia gas into said scrubbing space, a second conduit means for withdrawing gas from said scrubbing space, spray means extending through the inner peripheral wall for receiving liquor and crystals from said inner chamber and for spraying said liquor and crystals into said scrubbing space for removing ammonia from the gas within said scrubbing space, pump means for withdrawing liquor from a lower portion of said bath space and for passing said liquor into a lower portion of said inner chamber, and means disposed in the tapered bottom portion of said outer chamber for deflecting the flow of liquor in said bath in the tapered lower portion thereof toward the intake of said pumping means whereby to diminish the tendency of crystals to accumulate in said tapered lower portion of said bath.

3. A spray saturator for converting the ammonia content of coke oven gas into ammonium sulphate liquor and crystals, comprising first and second vertically extending peripherally continuous wall structures disposed one within the other to define separate inner and outer chambers having spaced tapered bottoms, the outer of said chambers being adapted to be partially filled with an ammonia liquor bath and to have a scrubbing space thereabove, the inner of said chambers being normally filled with ammonium sulphate liquor and crystals under pressure greater than the pressure in said scrubbing space, a first conduit for introducing ammonia gas into said scrubbing space, a second conduit means for withdrawing gas from said scrubbing space, spray means extending through the inner peripheral wall for receiving liquor and crystals from said inner chamber and for spraying said liquor and crystals into said scrubbing space for removing ammonia from the gas within said scrubbing space, pump means having an intake extending from adjacent the bottom of said outer peripheral wall and an exhaust pipe extending through said tapered bottom portion of said outer peripheral wall to the tapered bottom portion of said inner peripheral wall for pumping liquor from said bath to said inner chamber, and means fixed to said exhaust pipe and disposed within said tapered bottom portion of said bath for deflecting the flow of liquor in said bath toward said lower portion thereof for withdrawal therefrom, whereby to diminish the tendency of crystals to accumulate in said lower portion.

4. A spray saturator for converting the ammonia content of coke oven gas into ammonium sulphate liquor and crystals, comprising first and second vertically extending peripherally continuous wall structures disposed one within the other to define separate inner and outer chambers having spaced tapered bottoms, the outer of said chambers being adapted to be partially filled with an ammonia liquor bath and to have a scrubbing space thereabove, the inner of said chambers being normally filled with ammonium sulphate liquor and crystals under pressure greater than the pressure in said scrubbing space, a first conduit for introducing ammonia gas into said scrubbing space, a second conduit means for withdrawing gas from said scrubbing space, spray means extending through the inner peripheral wall for receiving liquor and crystals from said inner chamber and for spraying said liquor and crystals into said scrubbing space for removing ammonia from the gas within said scrubbing space, pump means having an intake extending from adjacent the bottom of said outer peripheral wall and an exhaust pipe extending through said tapered bottom portion of said outer peripheral wall to the tapered bottom portion of said inner peripheral wall for pumping liquor from said bath to said inner chamber, and baffle means fixed to said exhaust pipe and disposed within said tapered bottom portion of said bath for deflecting the flow of liquor in said bath toward said lower portion thereof for withdrawal therefrom, whereby to diminish the tendency of crystals to accumulate in said lower portion.

5. A spray saturator for converting the ammonia content of coke oven gas into ammonium sulphate liquor and crystals, comprising first and second vertically extending peripherally continuous wall structures disposed one within the other to define separate inner and outer chambers having spaced tapered bottoms, the outer of said chambers being adapted to be partially filled with an ammonia liquor bath and to have a scrubbing space thereabove, the inner of said chambers being normally filled with ammonium sulphate liquor and crystals under pressure greater than the pressure in said scrubbing space, a first conduit for introducing ammonia gas into said scrubbing space, a second conduit means for withdrawing gas from said scrubbing space, spray means extending through the inner peripheral wall for receiving liquor and crystals from said inner chamber and for spraying said liquor and crystals into said scrubbing space for removing ammonia from the gas within said scrubbing space, pump means having an intake extending from adjacent the bottom of said outer peripheral wall and an exhaust pipe extending through said tapered bottom portion of said outer peripheral wall to the tapered bottom portion of said inner peripheral wall for pumping liquor from said bath to said inner chamber, and a plurality of vertically spaced baffles disposed within said tapered lower portion of said bath and fixed to said exhaust pipe and extending therefrom in different directions for imparting a spiral movement to the liquor in said bottom portion of said bath as said liquor flows towards said pump intake, whereby to diminish the tendency of crystals to accumulate in said lower portion.

6. A spray saturator for converting the ammonia content of coke oven gas into ammonium sulphate liquor and crystals, comprising first and second vertically extending peripherally continuous wall structures disposed one within the other to define separate inner and outer chambers having spaced tapered bottoms, the outer of said chambers being adapted to be partially filled with an ammonia liquor bath and to have a scrubbing space thereabove, the inner of said chambers being normally filled with ammonium sulphate liquor and crystals under pressure greater than the pressure in said scrubbing space, a first conduit means for introducing ammonia gas into said scrubbing space, a second conduit means for withdrawing gas from said scrubbing space, spray means extending through the inner peripheral wall for receiving liquor and crystals from said inner chamber and for spraying said liquor and crystals into said scrubbing space for removing ammonia from the gas within said scrubbing space, pump means having an intake extending from adjacent the bottom of said outer peripheral wall and an exhaust pipe extending through said tapered bottom portion of said outer peripheral wall to the tapered bottom portion of said inner peripheral wall for pumping liquor from said bath to said inner chamber, and a helical baffle secured to said exhaust pipe and disposed within said lower portion of said bath for imparting a spiral movement to the liquor in said bottom portion of said bath as said liquor flows toward said pump intake, whereby to diminish the tendency of crystals to accumulate in said lower portion of said bath.

7. A spray saturator for converting the ammonia content of coke oven gas into ammonium sulphate liquor and crystals, comprising first and second vertically extending peripherally continuous wall structures disposed one within the other to define separate inner and outer chambers having spaced tapered bottoms, the outer of said chambers being adapted to be partially filled with an ammonia liquor bath and to have a scrubbing space thereabove, the inner of said chambers being normally filled with ammonium sulphate liquor and crystals under pressure greater than the pressure in said scrubbing space, a first conduit means for introducing ammonia gas into said scrubbing space, a second conduit means for withdrawing gas from said scrubbing space, spray means extending through the inner peripheral wall for receiving liquor and crystals from said inner chamber and for spraying said liquor and crystals into said scrubbing space for removing ammonia from the gas within said scrubbing space, pump means having an intake extending from adjacent the bottom of said outer peripheral wall and an exhaust pipe extending through said tapered bottom portion of said outer peripheral wall to the tapered bottom portion of said inner peripheral wall for pumping liquor from said bath to said inner chamber, and a plurality of spaced nozzles fixed to said exhaust pipe within the lower portion of said bath, said nozzles being adapted to spray a part of the liquor flowing through said exhaust pipe back into said bath to deflect the flow of liquor in the lower part of said bath toward said intake, whereby to diminish the tendency of crystals to accumulate in said lower portion of said bath.

References Cited in the file of this patent

UNITED STATES PATENTS

| | | |
|---|---|---|
| 703,240 | Edson | June 24, 1902 |
| 2,409,790 | Otto | Oct. 22, 1946 |
| 2,435,898 | Otto | Feb. 10, 1948 |
| 2,549,848 | Otto | Apr. 24, 1951 |
| 2,599,067 | Otto | June 3, 1952 |